June 22, 1954  W. E. BRILL  2,681,838
SLIPPER TYPE BEARING STRUCTURE
Filed July 2, 1949

Inventor
William E. Brill
By
Spencer, Willetz, Hening & Baillio
Attorneys

Patented June 22, 1954

2,681,838

UNITED STATES PATENT OFFICE 2,681,838

SLIPPER TYPE BEARING STRUCTURE

William E. Brill, Cleveland, Ohio, assignor to General Motors Corporation, Detroit, Mich., a corporation of Delaware Application July 2, 1949, Serial No. 102,738

7 Claims. (Cl. 308—240)

The present invention generally relates to bearings and more particularly to slipper type bearings of arcuate form.

In that slipper type connecting rod bearings bear only on an arcuate portion of a crankpin the bearing loads thereon are high and the bearing surface of the rod is usually provided with bearing alloy bonded directly to the surface to provide satisfactory heat transfer and load distribution between the alloy and rod bearing surfaces to prevent separation of the alloy by fusion of the alloy and/or impact loads imposed thereon. The bonding of the bearing alloy to the rod involves a long and expensive process in order to provide satisfactory bearing operation for long periods of time.

The object of the present invention is to provide suitably formed bearing surfaces on a connecting rod and lubricating and cooling oil passages communicating therewith for retaining a replaceable bearing insert in firm and uniform metal to metal contact with the rod bearing surfaces and adjacent the rod lubricating and cooling passages to insure equal load distribution and adequate cooling and lubrication of the bearing surfaces of the rod and bearing insert which may be readily replaced.

The slipper bearing structure by which the above object is accomplished will become apparent by reference to the following detailed description and drawings illustrating the novel features of the invention.

Figure 1 of the drawings is an end elevational view of the bearing structure in disassembled relation with parts broken away.

Figure 1:
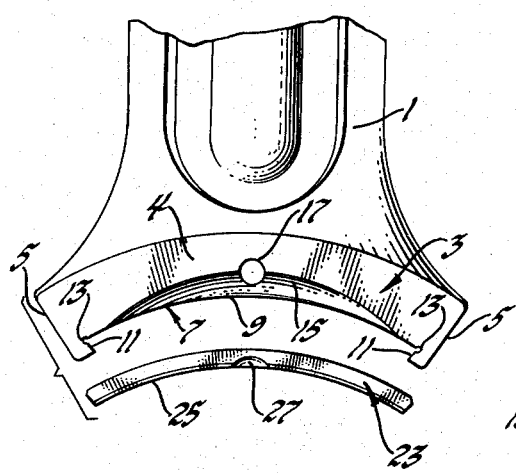
Figure 2:
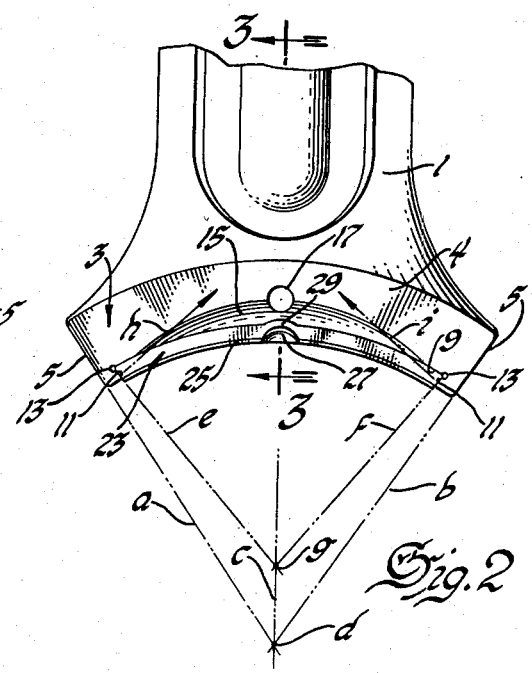
Figure 2 is a view similar to Figure 1 with the bearing structure assembled and parts broken away.

As best shown in Figure 1 a connecting rod 1 is shown provided with an arcuate slipper type bearing portion, generally indicated by the character reference 3, comprising opposite end thrust faces 4 and side surfaces 5. As best illustrated in Figure 2 the side surfaces project radially, as shown by projection lines a—b which intersect the longitudinal center plane of the rod, indicated by the line c, at the axis of curvature d of the arcuate surfaces of the bearing portion 3 of the rod 1. An arcuate bearing groove, generally indicated by the character reference 7, is provided in the arcuate outer end face of the rod bearing portion. This bearing groove 7 has an arcuate bottom surface 9 coaxial with the arcuate surfaces of the bearing portion 3 and side walls converging outwardly from the bottom surface 9 at an angle greater than the converging radial sides 5 of the bearing portion. The projection lines e—f from the sides 11 of the bearing groove 7 intersect the radial center plane of the coaxial arcuate surface 9 of the bearing groove 7 on a line g parallel to the axis of curvature of the surface 9 and between this axis and the surface 9 as best illustrated in Figure 2.

Figure 3:
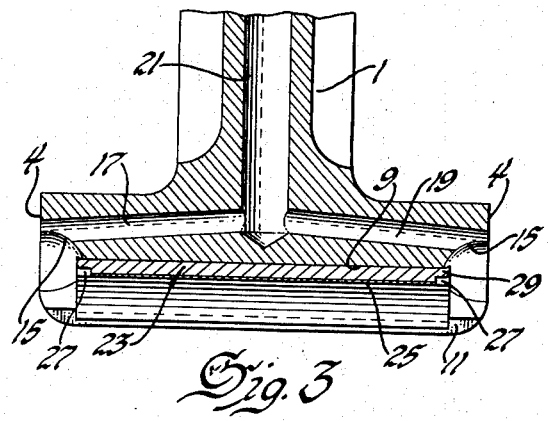
Figure 3 is a cross sectional side elevational view taken on line 3—3 of Figure 2 with parts shown in section and broken away.
Figure 4:
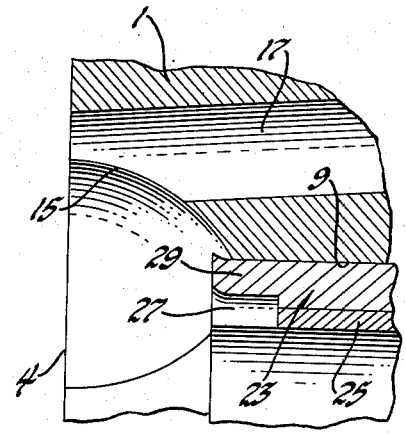
Figure 4 is an enlarged view of a portion of Figure 3 with parts shown broken away and in section.
Figure 5:
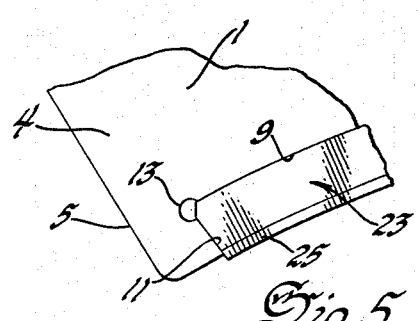
Figure 5 is an enlarged view of a portion of Figure 2 with parts shown broken away.

As best illustrated in Figures 1, 2 and 5, clearance slots 13 are provided at the junction of the sides 11 with the bottom surface 9 of the bearing groove 7 and, as illustrated in Figures 1 to 4 arcuate oil cooling and lubricating grooves 15 extending inwardly from the end faces 4 into the central end portions of the bottom 9 of the bearing groove 7. As shown in Figure 3 drilled oil passages 17—19 extend inwardly and upwardly from the end surfaces of the oil grooves 15 and intersect a longitudinally drilled oil hole 21 in the connecting rod adjacent the end of the hole 21 spaced radially outwardly from the bottom surface 9 of the bearing slot 7. The drilled passages 17—19—21 serve to convey cooling and lubricating oil to the opposite end piston pin bearing of the rod, piston and engine cylinder wall, not shown, from oil grooves 15 which are supplied with oil pressure from a passage in the engine crankshaft through radial holes in the ends of the crankpin, not shown, which intermittently register with the oil grooves 15 of the connecting rod 1.

A metallic arcuate bearing insert, generally indicated by the character reference 23 in the various figures of the drawings, of similar arcuate form to that of the connecting rod bearing groove 7 and having similarly converging sides and of slightly larger arcuate length and slightly greater radial thickness than the depth of the bearing groove 7 is provided to permit longitudinal insertion of this bearing insert into the groove upon expansion of the rod by heating and/or contraction of the insert by cooling. The difference in dimensions of the insert 23 and rod groove 7 are such that the bearing portion 3 of the connecting rod and the bearing insert 23 is retained in a stressed condition in the groove at substantially the same temperature under all operating conditions of the engine and uniform equal and opposite forces are applied between the opposite inwardly converging sides 11 of the rod groove 7 and bearing insert 23 in directions normal to these surfaces. The forces exerted on the opposite faces of the bearing insert 23 are represented by the vectors h—i normal to these surfaces and converging inwardly and intersecting the bottom surface 9 of the bearing slot adjacent the slot sides 11 and intersecting on the radial center plane of the arcuate surfaces of the rod groove and bearing insert thereby retaining the sides and inner arcuate surface of the insert in firm and uniform metallic contact with the sides 11 and bottom arcuate surface 9 of the bearing groove 7 of the rod 1 so that the bearing loads are distributed uniformly and efficient heat transfer is obtained between the bearing insert and bearing portion of the connecting rod. A suitable bearing alloy 25 is readily bonded to the outer surface of the bearing insert and slots 27 are shown in the end surface of the insert to provide thin wall portions at the ends overhanging the outwardly facing walls of the oil grooves 15 in the rod bearing portion as best illustrated in Figures 3 and 4. These thin wall portions of the insert are peened over into longitudinal abutting relation with the outer facing surfaces of the oil grooves to position the ends of the insert for adequate lubrication and cooling of the insert and end thrust faces of the rod and permit free exit of the cooling and lubricating oil through the drilled passages 17—19—21 in the rod 1.

The rod and insert are accordingly maintained at substantially the same temperature under all operating conditions of the engine to retain uniform distribution and efficient heat transfer therebetween. It will be evident that the bearing insert may be readily removed from the bearing groove by cutting an axial slot therethrough for insertion of another insert. The insert cannot move longitudinally in the slot to block oil flow to either of the drilled passages 17—19 by reason of the end portions 29 of the insert which are peened into abutting relation with the surfaces of the oil grooves 15 provided in the connecting rod bearing portion 3.

I claim:

1. In a slipper type bearing structure, a connecting rod including an end bearing portion having end thrust faces, a bearing slot extending axially between the end thrust faces and including an arcuate bottom face and radially inwardly inclined sides, said end thrust faces having oil lubricating and cooling slots inclined inwardly into the bottom of the bearing slot adjacent the ends and a bearing insert of arcuate form having inclined sides in firm abutting contact with the sides of the slot to stress the insert and hold one arcuate face in uniform contact with the bottom of the slot, said insert having end portions projecting axially part way into the oil lubricating grooves in the end thrust faces of the connecting rod bearing portion to retain the ends of the insert within the end thrust surfaces of the connecting rod.

2. In a slipper type bearing structure, an insert supporting member having an arcuate section groove extending longitudinally of the bearing axis and terminating circumferentially of said axis in side walls converging toward each other along lines intersecting each other between said axis and said groove, and a concentric arcuate shaped bearing insert seated in said groove and having its circumferentially spaced sides forming a shrink fit with said groove side walls.

3. In a slipper type bearing structure, an arcuate shaped bearing insert terminating in circumferentially spaced sides converging toward each other along lines intersecting the radial midplane of the structure intermediate the bearing axis and the intersection of said plane with the insert, and a supporting member therefor having a groove with an arcuate bottom surface concentric with said insert and terminating in circumferentially spaced side walls having a shrink fit with said insert sides whereby said insert and said bottom surface are held in clamped relation with each other.

4. The invention defined in claim 3, wherein said member is provided with end thrust faces at the axially opposite ends of said groove, said thrust faces having lubricant receiving grooves extending circumferentially of the bearing axis and intersecting said bottom surface, said insert having its axially opposite ends in locked engagement with said lubricant receiving grooves.

5. In a slipper type bearing structure, a connecting rod having an end portion having a bearing axis extending transversely to the longitudinal axis of the rod, said end portion having radially converging sides in circumferentially spaced relation about said bearing axis, end thrust faces in longitudinally spaced relation along said bearing axis and a bearing groove of arcuate section concentric with said bearing axis, said bearing groove terminating longitudinally of said bearing axis at said thrust faces and terminating circumferentially of said bearing axis in side walls spaced from said radially converging sides, said side walls converging toward each other at an angle greater than the angle included by said radially converging sides, said end thrust faces having lubricant receiving grooves extending circumferentially of said bearing axis and intersecting said bearing groove, and an arcuate section bearing insert seated in said bearing groove and having a bearing surface concentric with said bearing axis, said insert having its circumferential extremities forming a shrink fit with said bearing groove side walls and its longitudinal extremities in locked engagement with said lubricant receiving grooves.

6. The invention defined in claim 5, wherein said rod is provided with a longitudinal axial passage for lubricant and a connecting lubricant passage leading to the lower end of said axial passage from each said lubricant groove.

7. The method of securing a bearing insert to a slipper type supporting member comprising the steps of forming an arcuate section groove in the face of the member concentric with the bearing axis, forming the circumferentially opposing side walls of said groove in converging relation along lines intersecting the radial mid-plane of said member between the bearing axis and said face, forming the bearing insert to an arcuate shape section concentric with the bearing axis and to an arcuate length slightly greater than the circumferential spacing of said side walls, thermally expanding and contracting the supporting member and insert, respectively, to permit insertion of the insert into said groove, and then allowing said member and insert to return to their original temperatures while the insert remains in said groove.

References Cited in the file of this patent

UNITED STATES PATENTS

| Number | Name | Date |
|---|---|---|
| 1,121,849 | Kralund | Dec. 22, 1914 |